June 21, 1932. P. MÜLLER 1,864,090
DRIVE MECHANISM FOR THE ROLLS OF ROLLING MILLS
Filed May 23, 1931
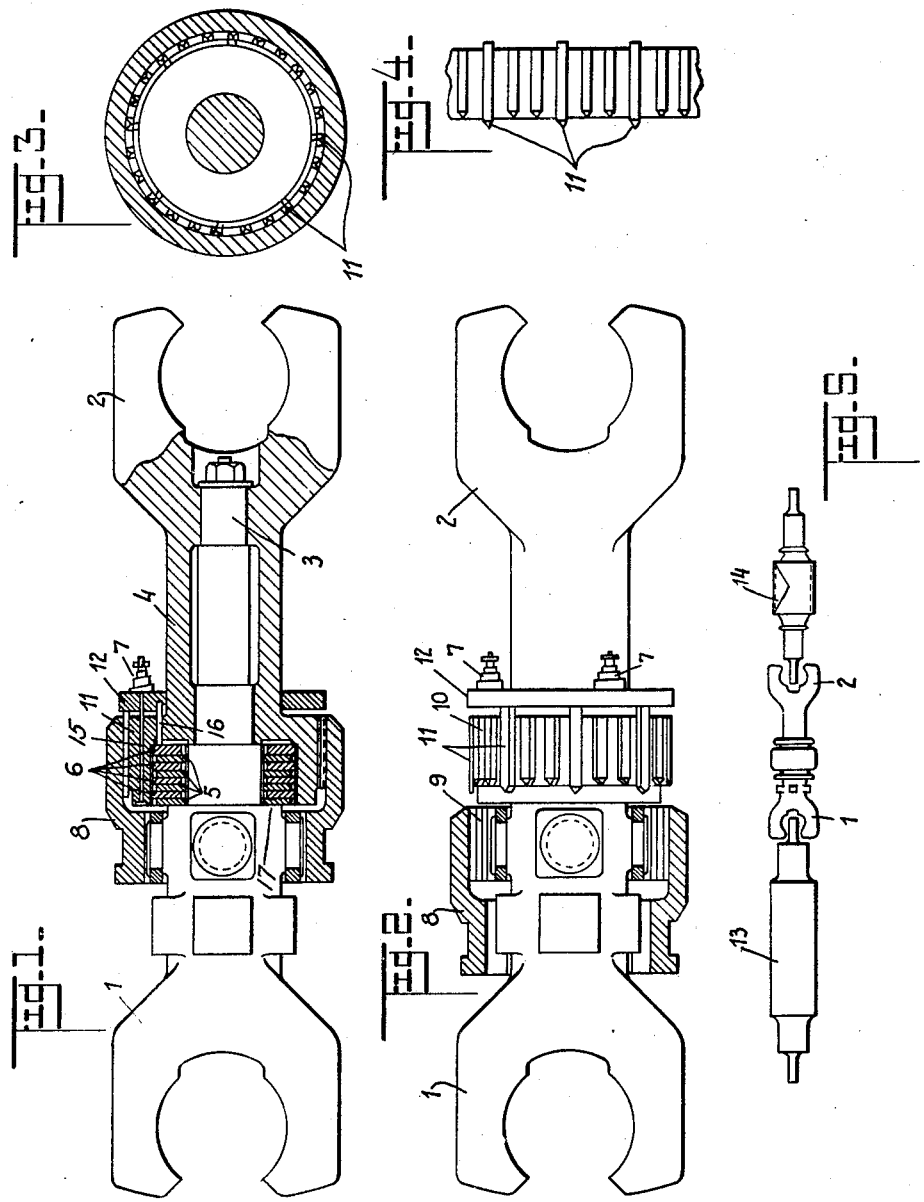
INVENTOR
PAUL MÜLLER.
BY
ATTORNEY Patented June 21, 1932

1,864,090

UNITED STATES PATENT OFFICE

PAUL MÜLLER, OF DUSSELDORF, GERMANY, ASSIGNOR TO SCHLOEMANN AKTIENGE-SELLSCHAFT, OF DUSSELDORF, GERMANY, A CORPORATION OF GERMANY

DRIVE MECHANISM FOR THE ROLLS OF ROLLING MILLS

Application filed May 23, 1931, Serial No. 539,602, and in Germany June 25, 1930.

My invention has reference to rolling mills, and the particular object of my invention is to produce a drive mechanism, whereby the top rolls of sheet-rolling mills may be driven at will either rigidly or yieldingly.

Top rolls of sheet rolling mills are usually driven either by means of rigid spindles or by friction spindles capable of yielding with relation to the direction of rotation.

Where sheets and more especially metal sheets are rolled, it is at times desirable to drive the roll in one operation in short succession with a rigid and a yielding driving spindle, but with the spindles now in use, this is impossible so that first one operation must be carried out with a rigid spindle and then the following operation with a friction spindle, or vice versa. This method, however, of changing from one spindle to another requires some time, and consequently, it becomes necessary to heat the sheets again between the two operations, where sheets are rolled hot.

According to the present invention, a single spindle is used for driving the roll, in combination with a means, whereby a rigid as well as a yielding coupling of the roll with its drive is made possible. In order to accomplish this, I make the driving spindle in two parts the stems of which are journalled one within the other and which are coupled with each other by a friction coupling permitting relative rotation of the two stems in case of a difference in the angular velocity of the two parts. Moreover, I provide an axially movable coupling sleeve, whereby the two stems may be rigidly connected.

The coupling sleeve movably mounted on one part of the spindle is provided on the inside with teeth adapted to engage corresponding teeth provided on the other part of the spindle and in order to facilitate the engagement of the teeth of the coupling sleeve with the teeth on the other part of the spindle, the latter teeth are given a pointed shape at the end where they are first engaged by the teeth of the coupling sleeve. Moreover, some of the teeth on the other part of the spindle are made as guiding teeth which, in case the teeth of the coupling sleeve should meet the corresponding teeth of the other part of the spindle, cause a loosening of the elements of the friction coupling, whereby the tangential position of the two coupling members and the engagement of the coupling sleeve are facilitated.

On the drawing, in which I have, by way of illustration, shown an embodiment of my invention, Fig. 1 shows the driving spindle with the two parts rigidly connected by the coupling sleeve, which is shown in section, one part of the spindle also being partly shown in section; Fig. 2 is a similar view as Fig. 1 showing the coupling sleeve withdrawn; Fig. 3 is a cross-section through that portion of the coupling sleeve containing the coupling teeth; Fig. 4 shows coupling teeth on the one part of the spindle; Fig. 5 shows the spindle in position between the cam roll and the driven top roll.

The spindle as shown on the drawing comprises two parts, 1 and 2. The stem 3 of part 1 is journalled within the hollow stem 4 of part 2. The two parts 1 and 2 are operatively connected by means of a friction disk coupling, the disks 5 of this coupling being secured to part 1 and the disks 6 to part 2. The disks 5 and 6 are forced into frictional engagement with the collar 17 of part 1 by springs 7 by means of screw 15 and bolts 16 so as to transmit the driving force. If this force becomes greater than intended the disks 5 and 6 will glide upon each other.

Upon part 1 of the spindle there is axially movably mounted a sleeve 8 which inside the portion facing the other part 2 is provided with coupling teeth 9 adapted to engage corresponding teeth 10 provided on the part 2. In addition to these fixed teeth 10, there are provided on the part 2 movable teeth 11 which in the direction toward the part 2 abut against a collar 12, on which act the springs 7 for pressing against each other the disks 5 and 6 of the friction coupling above mentioned.

The part 1 of the spindle, as shown in Fig. 5, is operatively connected with the driven top roll 13 and the part 2 with the cam roll 14.

When the coupling sleeve 8 occupies the position shown in Fig. 1, in which the teeth of the coupling sleeve engage the teeth on part 2 of the spindle, the two parts of the spindle are rigidly connected, and consequently the rotation of the cam roll 14 is rigidly transmitted to the top roll 13. When the coupling sleeve 8 is withdrawn to the position shown in Fig. 2, the two parts of the spindle are solely connected by the friction disk coupling which allows a yielding or relative movement between parts 1 and 2.

It may happen, that in the inoperative position of the coupling sleeve, the teeth in the forward portion thereof and the teeth on part 2 of the spindle do not occupy the correct relative position to permit the teeth of the coupling sleeve to easily engage with the teeth provided on part 2 of the spindle. The teeth provided on part 2 of the spindle are therefore pointed at their forward ends. Now, if the coupling sleeve is moved into operative position, especially the pointed forward ends of the movable teeth 11 when engaging the teeth inside the coupling sleeve will cause a relative slight twist of parts 1 and 2 of the spindle to permit the teeth on part 2 of the spindle to engage the corresponding teeth of the coupling sleeve. To this end, however, the frictional engagement of the disks 5 and 6 of the friction coupling must be temporarily relieved. This is accomplished by the movable teeth 11 which upon the coupling sleeve being moved into operative position, are forced against the collar 12 carrying the springs 7. Thereby the pressure of the springs is temporarily suspended, the friction coupling is relieved and the parts 1 and 2 of the spindle can be readily twisted relative to each other to permit easy engagement of the coupling teeth of the coupling sleeve with the teeth provided on part 2 of the spindle.

While I have described an embodiment of my invention in detail, it will be understood, that my invention is not limited thereto but may be embodied in other modifications coming within the scope and principle of my invention.

I claim:

1. In combination with the roll of a rolling mill, a driving spindle comprising two parts one journalled within the other, a friction coupling operatively connecting said two parts, one of said parts being provided with coupling teeth, and a movable sleeve mounted on the other part and provided with teeth to engage said coupling teeth thereby rigidly connecting said parts.

2. In combination with the roll of a rolling mill, a driving spindle comprising two parts one part being journalled within the other, a friction coupling operatively connecting said two parts, a spring controlled element acting on said friction coupling, one of said parts being provided with coupling teeth, some of these teeth bearing against said element and acting as guide teeth, and a movable sleeve mounted on the other part and provided with teeth to engage said coupling teeth to thereby rigidly connect said two parts, said guide teeth causing a release of the pressure on said friction coupling so as to permit the coupling teeth to correctly engage each other.

3. The combination as specified in claim 2, in which the forward ends of said coupling teeth are pointed to facilitate the engagement of said coupling teeth with the teeth of said coupling sleeve.

In testimony whereof I affix my signature.

PAUL MÜLLER.